United States Patent [19]

Tomita et al.

[11] 4,067,851

[45] Jan. 10, 1978

[54] PROCESS FOR PREPARING POLYPHENYLENE OXIDES

[75] Inventors: Tetsuo Tomita; Tadashi Yoshii; Akira Ito, all of Tokyo, Japan

[73] Assignee: Mitsubishi Gas Chemical Company, Inc., Tokyo, Japan

[21] Appl. No.: 639,141

[22] Filed: Dec. 9, 1975

Related U.S. Application Data

[63] Continuation-in-part of Ser. No. 445,762, Feb. 25, 1974, abandoned, which is a continuation-in-part of Ser. No. 205,716, Dec. 7, 1971, abandoned.

[30] Foreign Application Priority Data

Nov. 16, 1970 Japan ................................ 45-100148
Dec. 7, 1970 Japan ................................ 45-107637

[51] Int. Cl.$^2$ .............................................. C08G 65/44
[52] U.S. Cl. ............................................... 260/47 ET
[58] Field of Search ................................... 260/47 ET

[56] References Cited

U.S. PATENT DOCUMENTS

| | | | |
|---|---|---|---|
| 3,306,874 | 2/1967 | Hay ......................................... | 260/47 |
| 3,306,875 | 2/1967 | Hay ......................................... | 260/47 |
| 3,365,422 | 1/1968 | Van Dort ................................ | 260/47 |
| 3,384,619 | 5/1968 | Hori et al. .............................. | 260/47 |
| 3,787,358 | 1/1974 | Nishiolea et al. ...................... | 260/47 |

FOREIGN PATENT DOCUMENTS 2,116,555   7/1972   France.

*Primary Examiner*—Lester L. Lee
*Attorney, Agent, or Firm*—Sughrue, Rothwell, Mion, Zinn and Macpeak

[57] ABSTRACT

Polyphenylene oxides, self-condensation products of phenols, are prepared with a high yield through oxidative coupling by employing a catalyst system with higher activity, which comprises a copper compound, iodine or an iodine-containing compound and a primary amine.

7 Claims, No Drawings

PROCESS FOR PREPARING POLYPHENYLENE OXIDES

CROSS-REFERENCE TO RELATED APPLICATIONS

This application is a Continuation-In-Part application to U.S. application Ser. No. 445,762 filed on Feb. 25, 1974 and now abandoned, which in turn was a Continuation-In-Part Application of U.S. application serial No. 205,716 filed on Dec. 7, 1971 and now abandoned, these applications being entitled "A Process for Preparing Polyphenylene Oxides".

BACKGROUND OF THE INVENTION

This invention relates to a process for condensing phenols to form polyphenylene oxides useful as thermoplastics. More particularly, this invention relates to the preparation of polyphenylene oxides by reacting substituted phenols with oxygen or an oxygen-containing gas in the presence of a catalyst consisting of a copper compound, a primary amine and iodine or an iodine-containing compound.

Heretofore, there have been known processes which employ a cuprous salt with a tertiary amine, a basic cupric salt with a primary amine or a secondary amine, and a cupric salt with an amine and a base as a copper salt-amine catalyst in the preparation of polyphenylene oxides. However, the polymers which are obtained by employing the above-mentioned catalysts, are generally somewhat discolored and the intrinsic viscosity, which represents the polymerization degree of the condensation products, rarely exceeds 1.3 dl./g. but shows generally figures less than 0.8 dl./g. Furthermore, the time for absorption of a theoretical volume of oxygen is more than 20 minutes and the yield of polymer rarely exceeds 90%.

SUMMARY OF THE INVENTION

The object of the invention is to provide a novel catalyst system for preparing polyphenylene oxides.

A further object of this invention is to provide a process for remarkably increasing polymerization velocity, as well as obtaining colorless products having a high polymerization degree and in a high yield.

Another object of the invention is to provide a process for making a catalyst system very active, which hitherto has been considered to be not effective for the condensation or weak in its activity.

U.S. Pat. No. 3,306,874 describes that:
1. cupric acetate will form a complex with primary or secondary amines which will produce polyphenylene ethers, but these products are low in molecular weight and the reaction is slow . . . (see Col. 12 of the specification);
2. cupric hydroxide is an inactive ingredient (in Col. 11);
3. cuprous iodide, cuprous sulfide, cupric sulfide, etc., are not suitable for use, since they are either insoluble in primary or secondary amines or are not capable of existing as stable cupric salts.

Now, the following facts have been discovered by the inventors:

In the case where an iodine compound is present in a cupric acetateamine complex system, the reaction velocity becomes a few times higher than in the case when it is not present, and a product having a much higher molecular weight can be obtained;

A cupric hydroxide-amine complex system, which has been recognized to be almost inactive as a catalyst can be rendered very active as a catalyst which can produce a product of very high polymerization degree by adding an iodine compound thereto;

Further, cuprous or cupric sulfide has been found to become very effective in combination with iodine or iodine-containing compound and with primary amines.

Surprisingly, it has also been discovered that cuprous iodide, which contains iodine in the molecule, acts by itself as an excellent catalyst in the presence of primary amines.

There is disclosed in Japanese Patent Publication No. 22,153/1970 that a catalyst consisting of cuprous oxide and an amine is capable of forming condensation products.

According to this method, however, a large amount of cuprous oxide is required for polymerization and yet products having very high molecular weights cannot be expected to be obtained. When the principle of this invention, that an iodine compound is present in the catalyst system, is applied to this case, even a small amount of cuprous oxide can increase the reaction velocity markedly and form highly condensed products.

Therefore, this invention relates to a process for preparing polyphenylene oxides which comprises forming self-condensation products by oxidizing phenols with oxygen or an oxygen-containing gas in the presence of a catalyst consisting of;
 a. a copper compound, other than cuprous chloride and cuprous bromide, which is capable of forming a complex with an amine and iodine or an iodine-containing compound,
 b. a primary amine, and
 c. iodine or an iodine-containing compound.

DETAILED DESCRIPTION OF THE INVENTION

The phenols which can be condensed by our process may be represented by the following formula

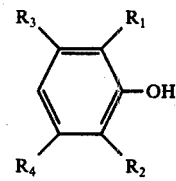

where $R_1$, $R_2$, $R_3$ and $R_4$ are substituents selected from the group consisting of hydrogen, chlorine, hydrocarbon radicals, halohydrocarbon radicals, hydrocarbonoxy radicals and halohydrocarbonoxy radicals, but wherein $R_1$, $R_2$, $R_3$ and $R_4$ are not all hydrogen at the same time.

Typical examples of the compounds are 2,6-dimethylphenol, 2-methyl-6-ethylphenol, 2,6-diethylphenol, 2,6-dimethoxyphenol, 2-methoxy-6-methyl phenol, 2-methyl-6-phenylphenol, 2,6-diphenylphenol, 2,6-dimethyl-3-chlorophenol, etc.

In our invention a wide variety of copper compounds can be used. Typical examples of the compounds are cupric chloride, cupric bromide, cuprous sulphate, cupric sulphate, cuprous sulfide, cupric sulfide, cuprous oxide, cupric oxide, cuprous acetate, cupric acetate, cupric propionate, cupric butyrate, cupric benzoate, basic cupric carbonate, basic cupric acetate, cupric hydroxide, cupric nitrate, cuprous iodide, cuprous cyanide, cupric thiocyanate, etc.

Cupric phosphate, cupric oxalate, cupric pyrophosphate may be considered to be a stable complex by themselves, and they are not further capable of forming a complex with the amine. Accordingly, they are not suitable for our process.

The amount of the copper compound used in our invention may widely vary, but it is preferable that the amount is 0.1-100% by weight of that of the phenols.

As to the iodine-containing compound, substances which are capable of liberating the iodine anion or simple substances of iodine in the reaction solution can be used. Such compounds are of wide variety. For example, there can be mentioned iodine itself, hydrogen iodide, alkali metal iodides such as potassium iodide, and alkyl iodides such as methyl iodide, ethyl iodide, etc. The amount of the iodine compound may also be changed widely, but it is preferably employed between about 10 to 100 mole percent of the total moles of the employed copper compound.

Examples of the primary amines used in our invention are aliphatic or cycloaliphatic monoamines such as monomethylamine, monoethylamine, monopropylamine, monobutylamine, monolaurylamine, monocyclohexylamine, monobenzylamine, β-phenylethylamine, etc. The amount of the amines used is desirably one equivalent or more for each mole of the copper compounds.

Solvents to dissolve the condensation products are generally used, which include benzene, toluene, xylene, dichloroethane, tetrachloroethane, chloroform, etc. As the solvents there may also be used amines, a constituent of the complex in the reaction, which are capable of dissolving the condensation products.

According to our invention, condensation products having very high molecular weight are generally obtained. For the purpose of obtaining products of lower molecular weight, it can be suggested that liquids, which do not dissolve the product, are mixed with the above-mentioned solvent in proper amount in order to decrease the solubility of the product in the reaction mixture, resulting in precipiatation of the product having the desired range of molecular weight to be separated. However, generally the separation of condensation products is carried out by pouring the reaction mixture into water, methanol, ethanol, acetone or the like, which does not dissolve the product, and thereby precipitating. It is preferable that there be present enough mineral acid to decompose the copper-amine complex in the liquid which is employed for the precipitation.

Oxidizing agents used in this invention can be oxygen gas, an oxygen-containing gas such as air and the like.

The reaction temperature in this invention can vary widely, and a range of 0° C to the boiling point of the reaction mixture is generally used. Usually room temperature reaction is satisfactory. The reaction time may vary depending upon the conditions adopted in each case, and the reaction may be either stopped at the point where the theoretically required amount of oxygen has been absorbed or continued for a certain time after that point has been reached in order to obtain more highly condensed products.

EXAMPLE 1

To the mixture of 0.191 g. (2m.mol.) of cupric sulfide and 0.127 g. (1 m.mol.) of iodine was added 5.0 ml. (50 m.mol.) of n-butylamine.

Then 2.44 g. (20 m.mol.) of 2,6-dimethylphenol dissolved in 55 ml. of toluene was added to the solution and the mixture was stirred under the atmosphere of oxygen for ten minutes, keeping the temperature at 30° C by cooling, until 241 ml. of oxygen was absorbed.

The reaction was continued further for 60 minutes. Then the reaction mixture was poured into 400 ml. of methanol containing a small amount of hydrochloric acid, whereby the polymer was precipitated. The resulting polymer was filtered, washed with methanol, dissolved again in benzene, and then was reprecipitated by addition of methanol. After drying at 60° C under reduced pressure, there was obtained 2.36 g. of poly(2,6-dimethyl-1,4-phenylene)ether. The product was quite colorless and its intrinsic viscosity measured in chloroform at 25° C was as high as 2.00 dl/g.

EXAMPLES 2 – 10

The following examples illustrate the effectiveness of our process, compared with the process where an iodine compound is absent in the catalyst system. Each example was carried out almost in the same way as Example 1 except for the kinds and amounts of copper compound and iodine compound.

| Ex. No. | Cu compound | Amount (gr.) | I compd. | Amt. (gr.) | Time for absorption of theo. $O_2$ | Yield (gr.) | Intrinsic viscosity (dl./gr.) | Yield (%) |
|---|---|---|---|---|---|---|---|---|
| 2 | $Cu_2O$ | 0.132 | — | — | 95 | 2.01 | 0.34 | 87.91 |
|   |   | 0.105 | $I_2$ | 0.167 | 20 | 2.40 | 1.27 | 99.99 |
|   |   | 0.103 | KI | 0.350 | 15 | 2.29 | 0.98 | 95.4 |
| 3 | CuO | 0.150 | — | — | not reacted | — | — | — |
|   |   | 0.094 | HI | 1 ml.(52 % aq.) | 18 | 2.40 | 1.12 | 99.99 |
| 4 | $Cu(OH)_2$ | 0.195 | — | — | not reacted | — | — | — |
|   |   | 0.195 | HI | 1 ml. (52 % aq.) | 5 | 2.40 | 1.60 | 99.99 |
|   |   | 0.195 | KI | 0.333 | 7 | 2.40 | 2.10 | " |
|   |   | 0.195 | $I_2$ | 0.127 | 10 | 2.40 | 1.90 | " |
| 5 | $Cu(CH)_2$ | 0.195 | $C_2H_5I$ | 5 ml. | 10 | 2.32 | 1.90 | 96.7 |
| 6 | $Cu(CH_3COO)_2 \cdot H_2O$ | 0.400 | — | — | 55 | 2.11 | 0.35 | 87.91 |
|   |   | 0.400 | $I_2$ | 0.127 | 11 | 2.32 | 1.57 | 96.66 |
| 7 | $Cu(NO_3)_2 \cdot 3H_2O$ | 0.483 | — | — | 9 | 2.26 | 0.54 | 94.16 |
|   |   | 0.484 | $I_2$ | 0.128 | 9 | 2.40 | 1.54 | 99.99 |
| 8 | $CuSO_4$ | 0.319 | — | — | 100 | 2.07 | 0.28 | 86.24 |
|   |   | 0.319 | $I_2$ | 0.126 | 15 | 2.35 | 2.00 | 97.91 |
| 9 | $CuCO_3 \cdot Cu(CO)_2$ | 0.239 | — | — | not reacted | — | — | — |
|   |   | 0.239 | $I_2$ | 0.128 | 14 | 2.33 | 1.90 | 97.08 |
| 10 | CuCN | 0.180 | — | — | 24 | 2.05 | 0.54 | 85.41 |

-continued

| Ex. No. | Cu compound | Amount (gr.) | I compd. | Amt. (gr.) | Time for absorption of theo. $O_2$ | Yield (gr.) | Intrinsic viscosity (dl./gr.) | Yield (%) |
|---|---|---|---|---|---|---|---|---|
| | | 0.180 | $I_2$ | 0.103 | 12 | 2.27 | 1.25 | 94.53 |

EXAMPLES 11 – 20

The following examples show the successful results of the experiments carried out by employing cuprous iodide without any other iodine compound in the presence of various kinds of primary amines.

In each example 0.38 gr. (2 m.mol.) of cuprous iodide was employed, and the reaction period after primary absorption of oxygen was 30 minutes instead of 60 minutes in Example 1. Other conditions were the same as those of Example 1.

| Ex. No. | Amine | Polyphenylene oxide Yield (gr.) | Intrinisic viscosity (dl./gr.) | Yield (%) |
|---|---|---|---|---|
| 11 | n-propylamine | 2.31 | 1.72 | 96.24 |
| 12 | iso-propylamine | 2.36 | 1.17 | 98.33 |
| 13 | n-butylamine | 2.40 | 2.54 | 99.99 |
| 14 | mixture of iso-and n-amylamine | 2.33 | 2.20 | 97.08 |
| 15 | hexylamine | 2.31 | 1.95 | 96.24 |
| 16 | 2-ethylhexylamine | 2.30 | 1.61 | 95.83 |
| 17 | laurylamine | 2.40 | 1.54 | 99.99 |
| 18 | benzylamine | 2.40 | 2.52 | 99.99 |
| 19 | β-phenylethylamine | 2.35 | 1.39 | 97.91 |
| 20 | monocyclohexylamine | 2.32 | 1.26 | 96.7 |

EXAMPLES 21 – 22

The results of experiments employing methyl iodide is shown in the following examples. 0.195 g. of cupric hydroxide, 3.66 g (5.0 ml.) of n-butylamine, 2.44 g. of 2,6-dimethyl-phenol and 50 g. of toluene were employed as the remaining components of the reaction system.

Reaction was carried out as in Example 1.

| Ex. No. | I compd. | Amt. (g.) | Time for absorption of theo. $O_2$ (min.) | Yield (g.) | Intrinsic viscosity (dl./g.) | Yield (%) |
|---|---|---|---|---|---|---|
| 21 | $CHI_3$ | 0.78 | 3 | 2.32 | 2.95 | 96.66 |
| 22 | $CH_3I$ | 0.28 | 13 | 2.34 | 0.73 | 97.49 |

EXAMPLE 23

Reaction was carried out as in Example 1, employing 0.096 g. of cupric hydroxide, in the absence of iodine and in the presence of 0.127 g. of iodine, 1.83 g. (2.5 ml.) of n-butylamine, 1.0 g. of 2,3,6-trimethyl-phenol as a substituted phenol and 30 g. of toluene. The reaction temperature was 30° ± 3° C.

In the absence of iodine the absorption of oxygen stopped at 50% of the theoretically required amount in seven minutes, and the reaction was continued another 113 minutes. A colorless product was obtained which represented only 40% of the theoretical yield.

In the presence of 0.127 g. of iodine, however, the theoretical amount of oxygen was absorbed in only three minutes and the reaction continued another 57 minutes. A colorless product was obtained which represented 98.6% of the theoretical yield.

While the present invention has been illustrated by a detailed description of a preferred embodiment thereof, it will be obvious to those skilled in the art that various changes in form and detail can be made therein without departing from the true scope of the invention. For that reason, the invention must be measured by the claims appended hereto and not by the foregoing preferred embodiment.

What is claimed is:

1. A process for preparing polyphenylene oxides which comprises forming self-condensation products by oxidizing substituted phenols selected from the group consisting of 2,6-dimethylphenol, 2-methyl-6-ethylphenol, 2,6-diethylphenol, 2,6-dimethoxyphenol, 2-methoxy-6-methyl phenol, 2-methyl-6-phenylphenol, 2,6-diphenylphenol, and 2,6-dimethyl-3-chlorophenol with oxygen or oxygen-containing gas in the presence of a catalyst consisting of
   a. copper compound other than cuprous chloride and cuprous bromide capable of forming a complex with an amine,
   b. a primary amine, and
   c. iodine or an iodine-containing compound selected from the group consisting of hydrogen iodide, alkali metal iodide and ethyl iodide.

2. A process of claim 1, wherein the primary amine is an aliphatic or cyclo-aliphatic monoamine.

3. A process of claim 1, wherein the copper compound is combined with iodine compound as cuprous iodide.

4. A process for preparing polyphenylene oxides which comprises forming self-condensation products by oxidizing substituted phenols selected from the group consisting of 2,6-dimethylphenol, 2-methyl-6-ethylphenol, 2,6-diethylphenol, 2,6-dimethoxyphenol, 2,-methoxy-6-methyl phenol, 2-methyl-6-phenylphenol, 2,6-diphenylphenol, and 2,6-dimethyl-3-chlorophenol with oxygen or oxygen-containing gas in the presence of the catalyst consisting of cuprous iodide and a primary amine.

5. A process of claim 4, wherein the primary amine is an aliphatic or cycloaliphatic monoamine.

6. A process of claim 4, wherein the amount of the cuprous iodide is 0.1 – 100% by weight of that of the phenols.

7. A process of claim 4, wherein the amount of the amine is one equivalent or more per mole of the cuprous iodide.

* * * * *